Figure 1:
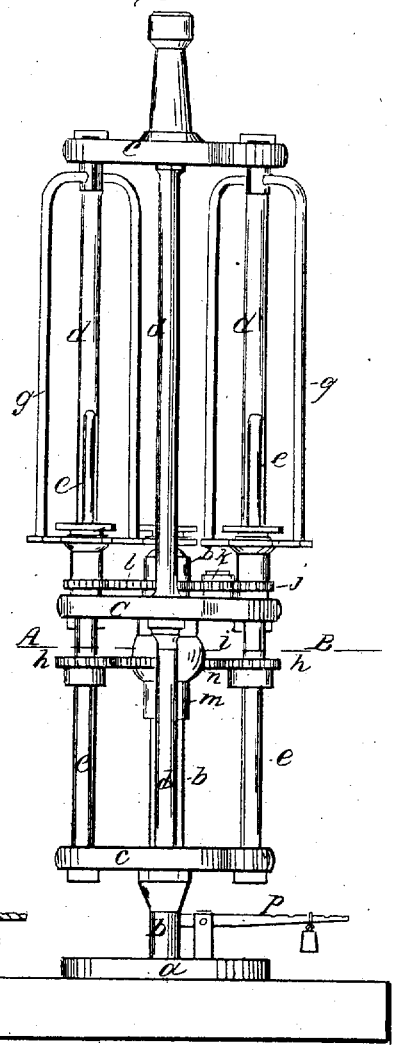

H. Pearce.

Cord Machine:

No. 504. Reissued Nov. 3. 1857.

Section

Elevation

Plan on line A.B.

Witnesses
Edward H. Knight
James Pearce

Henry Pearce

BEST AVAILABLE COPY

UNITED STATES PATENT OFFICE.

HENRY PEARCE, OF CINCINNATI, OHIO.

IMPROVEMENT IN CORDAGE MACHINERY.

Specification forming part of Letters Patent No. 12,920, dated May 22, 1855; Reissue No. 504, dated November 3, 1857.

*To all whom it may concern:*

Be it known that I, HENRY PEARCE, of Cincinnati, Hamilton county, Ohio, have invented new and useful Improvements in Machinery for Making Cord; and I hereby declare the following to be a full, clear, and exact description thereof, reference being had to the annexed drawings, making part of this specification.

The first branch of my invention consists in a new and peculiar mode of equalizing the paying out of the strands from the bobbins for the purpose of giving to them an equal tension and of making a cord of equally terminating and of regularly and evenly laid strands, whereby time, labor, and material are saved and a cord of superior quality and strength produced. The means employed for this purpose consist in mounting equally and uniformly filled bobbins upon spindles carrying equal-sized pinions, so arranged as to gear or mesh into a loose controlling-wheel common to all, so that as the spindles are rotated by the strain of the strands on the bobbins in the laying and reeling of the cord the bobbins are made to revolve simultaneously, and thus pay out the strands equally and with an even tension on each, from which it will be apparent that, as the bobbins were equally and uniformly filled and the strands regularly and evenly paid out and laid, a cord of superior quality and equally terminating ends must result, which would not be the case were the bobbins driven by a master-wheel because of lack of concert of action between the machinery for paying out and that for laying the strands.

The second branch of my invention consists in a new and peculiar mode of regulating the delivery of the entire set of bobbins by means of which any degree of tension required may be communicated to the strands in the laying of the cord.

Many plans have been essayed containing provisions for the equal laying of the component plies or strands in a cord, (usually by the discretionary application of a brake either to the individual bobbins or to the individual strands,) which indicate the existence of a want long known and felt among cordage-manufacturers. The most numerous class of expedients for the prevention of a riding ply have aimed to place under the control of the tenter a means of retarding the individual strands after they leave the bobbins, the several brakes—in the most complete examples—consisting of systems of pressure-rollers belted each to the others. These plans, beside involving great cost in their construction and operation, are inherently defective, because any irregularity in the substance of the strand instantly affects the delivery and tension. A thick strand having its axis farther from the periphery of the roller delivers faster than a thin, soft, or tightly-drawn strand, which closely hugs the roller, and this evil is aggravated by the sensible discrepancy generally seen in the wear of the rollers after a few months' use. Another objection to this device is that the twist of the strands is taken from the bight of the rope (where it is under the more immediate influence of the contrary twist of the cord) and confined between the rollers and the bobbins, necessitating either too tight a twist at the lower parts of the strands or too loose a twist at the upper parts.

In addition to these defects there is another class to which machines provided with bobbin-brakes are subject, consisting in the unequal tension of the strands, arising from the irregular obliquity and traverse of the "unwind" and the consequent unequal depletion and "giving out" of the bobbins. No cordage-machine hitherto known to me is capable of bringing the ends of the strands out together, and all require the constant vigilant attention of an experienced spinner in order to regulate the paying out of the several strands, and at the right instant to stop the machine in order to replace with a full bobbin each empty one as it gives out and to splice the ends, the latter operation causing numerous unsightly and injurious joints and enlargements, and also requiring greater vigilance than is commonly found among this class of operatives. Finally, when the proper amount for a reel is run off, all the strands have to be severed in whatever condition of depletion the bobbins may happen to be, and the remnants thus left on the bobbins are so often discarded as to occasion considerable loss.

The above-stated sources of imperfection and waste exist generally in cordage-machines now in use.

Figure 2:
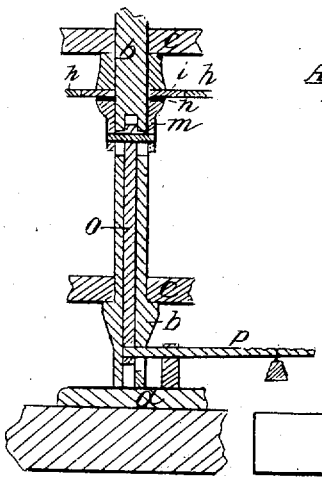
Figure 3:
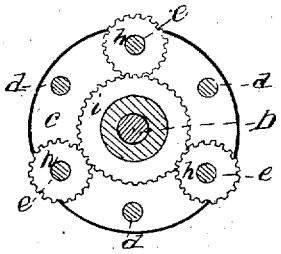

In the accompanying drawings, Figure 1 is an elevation of the twisting-frame. Fig. 2 is vertical section through the lower part of Fig. 1, showing the means employed to bring a pressure operating as a "brake" upon the bobbin-spindles. Fig. 3 is a plan on the line A B of Fig. 1, showing the means of connection of the bobbin spindles, by which they are made perfectly simultaneous in their rotation.

I will commence by describing the twisting-frame which is represented at Fig. 1. It consists of a base, *a*, with a vertical stationary shaft, *b*, firmly attached thereto and forming the support and axis of a frame, *c c c d d d*, consisting of disks *c* and connecting-rods *d*. Within this frame are placed, first, the spindles *e*, upon which are mounted the bobbins *f*, previously filled equally and uniformly in a suitable spooling-frame; secondly, the fliers *g*, each of which, revolving around its respective bobbin, twists the strand before it reaches its fellows to form the rope. The revolution of the fliers and of the bobbins are entirely independent. The former revolve in the usual manner in the opposite direction to that of the frame *c d* by means of pinions *j*, driven through the intervention of secondary pinions *k* by the spur-wheel *l*, which is fixed to the standard *b*. The bobbins are rotated by the tension of the strands as they are wound off, and the several bobbins are regulated to a precisely uniform speed by pinions *h*, Fig. 3, one upon each bobbin-spindle *e*, which pinions all mesh into the controlling-wheel *i*, running loosely on the central stationary stem or stud shaft, *b*.

Fig. 2 shows by a sectional view the device employed to give the required tightness to the strands as they are wound from the bobbins. It consists of a collar, *m*, and washer *n*, arranged underneath the loose controlling-wheel *i*, and acting as a brake or "rubber" to the said wheel by pressure from below, transmitted by the plunger *o*, passing up within the stem or column *b* from the weighted lever *p*. This central position of the plunger within the stem enables the checking action to be regulated with the greatest nicety while the machine is in motion, which is essential to its right adjustment, it being necessary, in order to insure efficient action and good work, that the tension of the strands should be closely watched, not only after the first application of a new set of bobbins, but in different conditions of their depletion. It is also necessary that the checking should be so applied as not to interfere with the twisting action of the strand, which requires to be allowed free scope after leaving the bobbin. The check should, therefore, as in the present case, act indirectly on the strand by means of the bobbin.

Instead of the lever and shifting weight here represented, a spring-bar provided with an adjusting-screw may be employed.

No necessity exists to stop the machine until a reel is filled, and so regular and uniform is the operation that whenever a set of bobbins gives out, a reel of five hundred yards is completed without any splicing, and the discrepancy in the tail ends of the strands seldom equals an inch.

In the manufacture of cordage on my plan it is essential that the bobbins be driven solely by the draft of the strands, and I thereore disclaim the device by which a number of fliers or spindles are driven by a single master-wheel, or by a positive motion of any kind independent of the draft of the strands. Such device could not be substituted for, nor is it capable of conversion to or being made suggestive of mine, or such application of it would long ago have been made. In my machine the bobbins are required to be strictly passive, exercising only the negative forces derived from their friction and inertia. The central controlling-wheel, *i*, also must be wholly inert and unconnected with everything but the bobbin-spindles, its functions beginning and ending wholly between and among them.

Having thus described my invention, what I claim therein as new, and desire to secure by Letters Patent, is—

1. The method herein described of equalizing the paying out of the strands from the bobbins for the purposes set forth.

2. The arrangement of a friction or rubbing collar, *m*, operated by a plunger, *o*, passing upward within the supporting-stem *b* and the weighted lever *p*, as described, or equivalent devices for regulating the degree of facility of the rotation of the bobbin-spindles.

In testimony whereof I have hereunto set my hand before two subscribing witnesses.

HENRY PEARCE.

Witnesses:

GEO. H. KNIGHT,
JAS. H. GRIDLEY.